Dec. 27, 1955          M. ALDEN          2,728,627

FACSIMILE RECORDER

Filed Jan. 3, 1950          7 Sheets—Sheet 1

Inventor
Milton Alden
by Roberts, Cushman & Grover
attys.

Dec. 27, 1955　　　　　　　　M. ALDEN　　　　　　　2,728,627
FACSIMILE RECORDER
Filed Jan. 3, 1950　　　　　　　　　　　　　　　7 Sheets-Sheet 2

Inventor
Milton Alden
by Roberts, Cushman & Grover
att'ys.

Dec. 27, 1955        M. ALDEN        2,728,627
FACSIMILE RECORDER
Filed Jan. 3, 1950        7 Sheets-Sheet 3
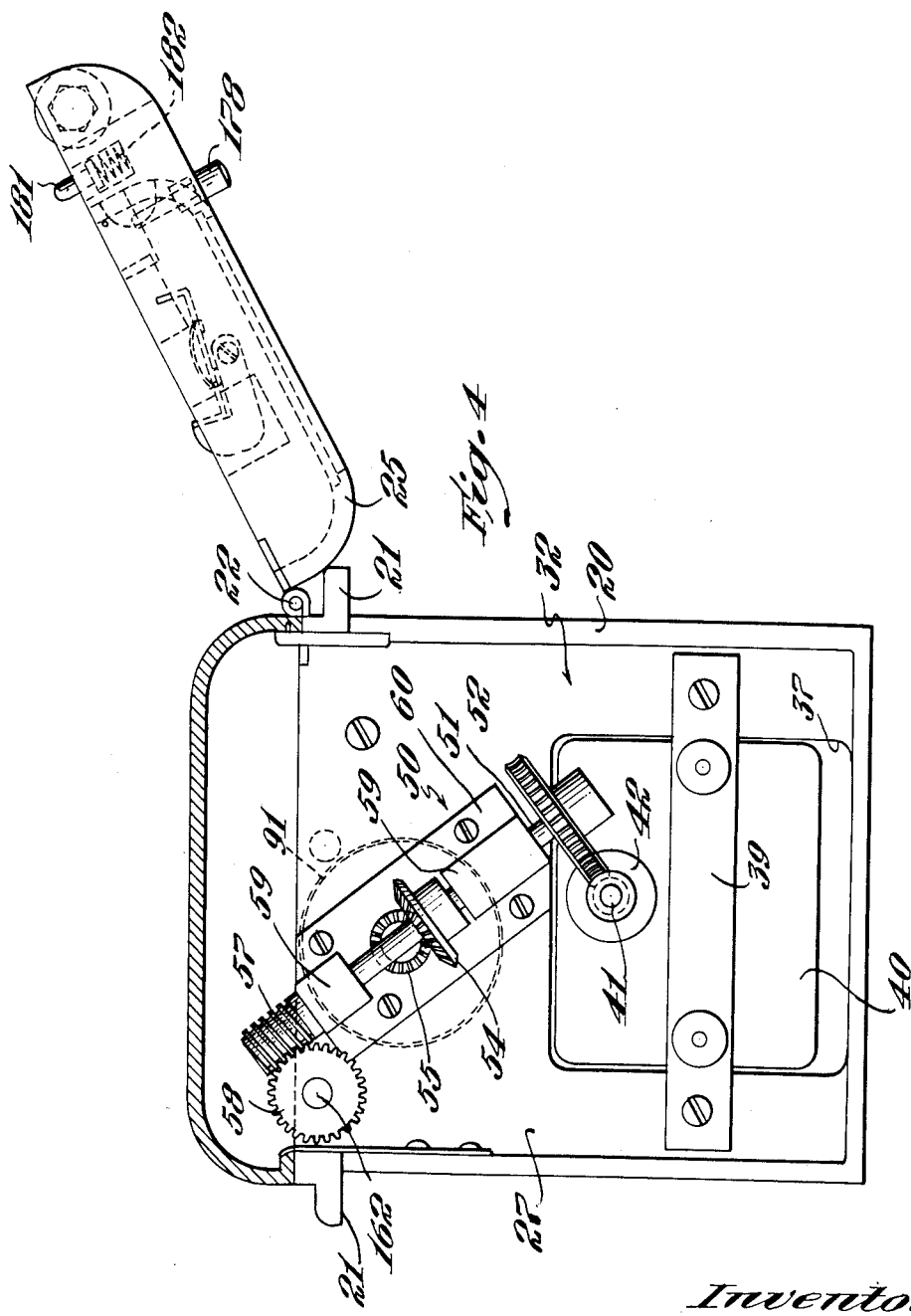
Inventor
Milton Alden
by Roberts, Cushman & Grove
att'ys.

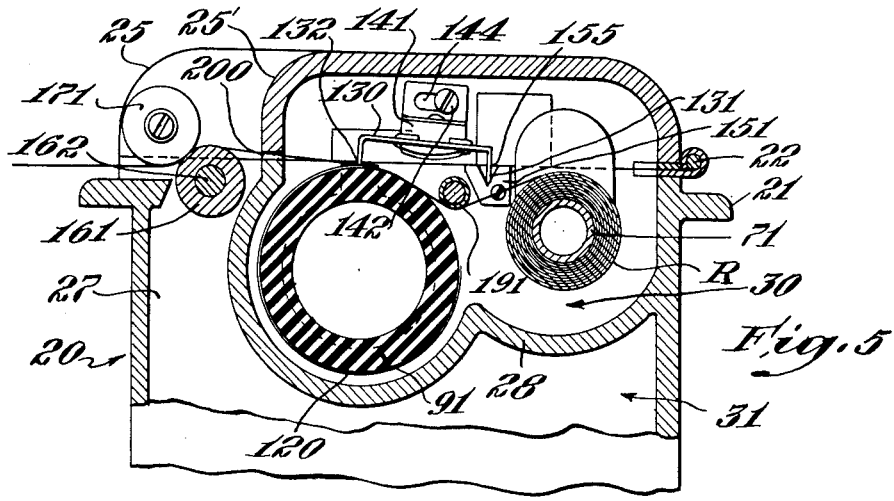
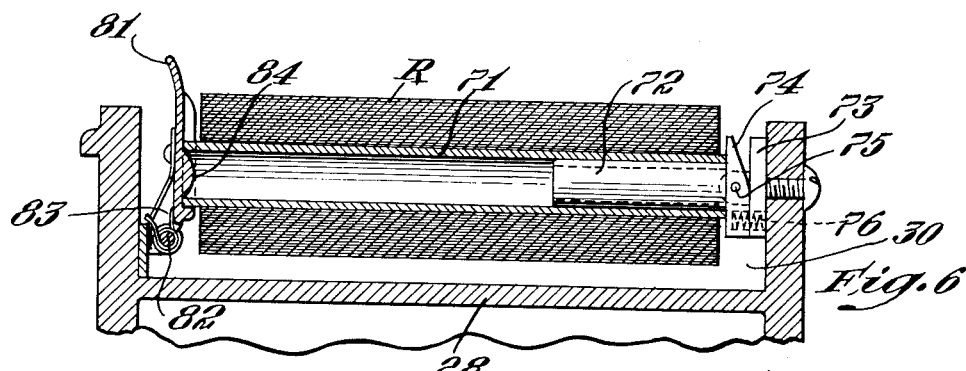
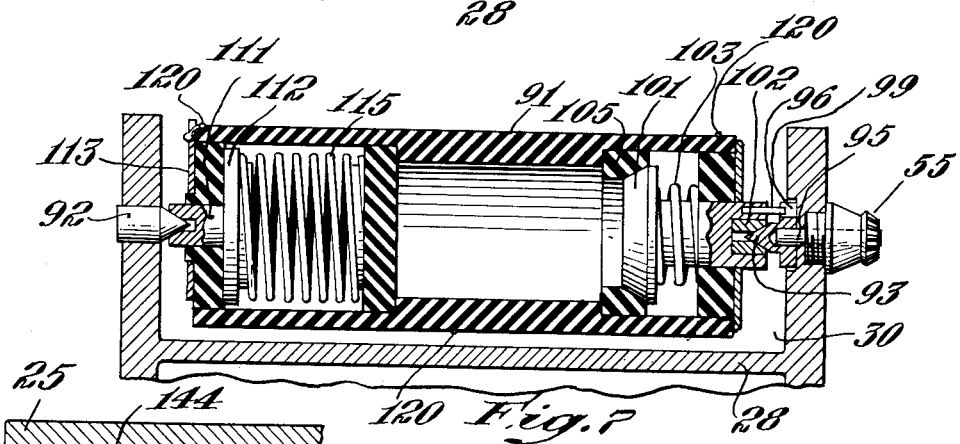
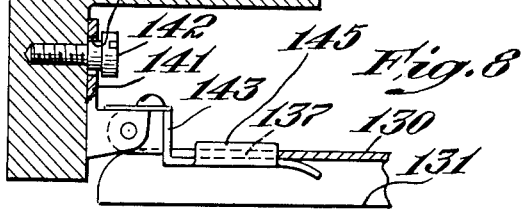

Dec. 27, 1955
M. ALDEN
2,728,627
FACSIMILE RECORDER
Filed Jan. 3, 1950
7 Sheets—Sheet 5
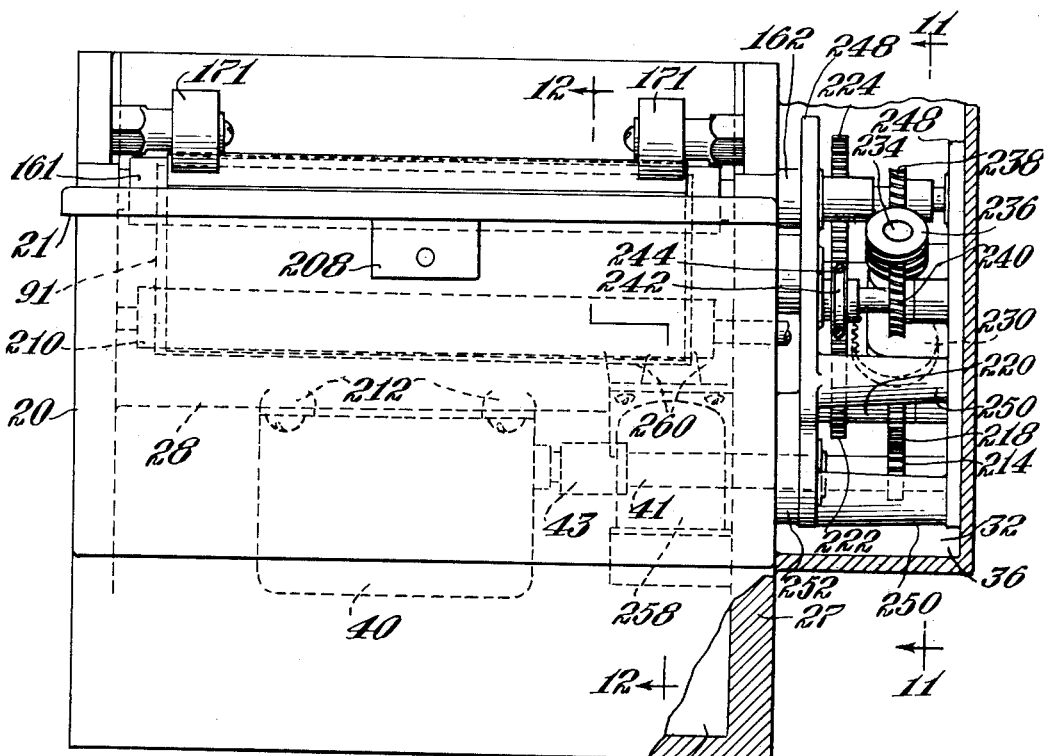
Fig. 10
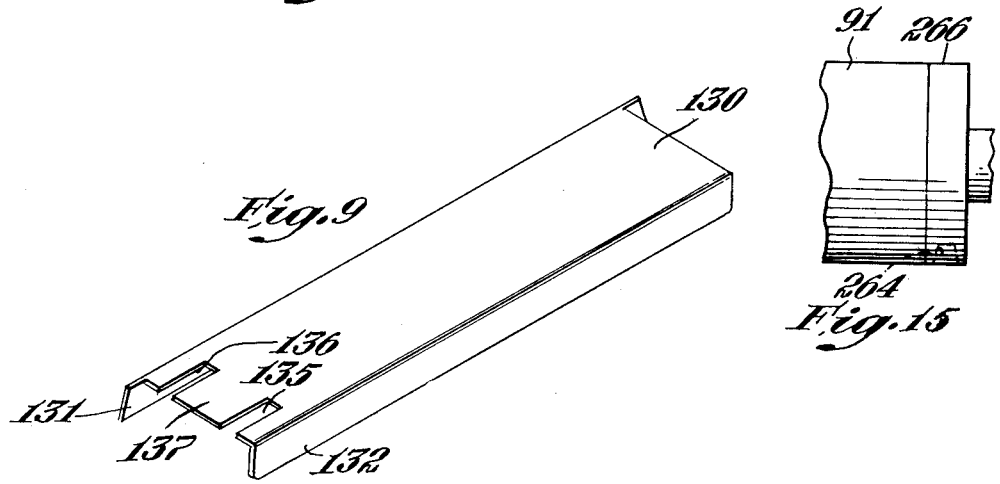
Fig. 9
Fig. 15
Inventor
Milton Alden
by Roberts, Cushman & Grover
att'ys.

Dec. 27, 1955

M. ALDEN 2,728,627

FACSIMILE RECORDER

Filed Jan. 3, 1950

Inventor
Milton Alden
by Roberts, Cushman & Grover
Att'ys.

Dec. 27, 1955  M. ALDEN  2,728,627
FACSIMILE RECORDER

Filed Jan. 3, 1950  7 Sheets-Sheet 7

Inventor
Milton Alden
by Roberts, Cushman & Grover
att'ys.

United States Patent Office 2,728,627
Patented Dec. 27, 1955

2,728,627

FACSIMILE RECORDER

Milton Alden, Wellesley, Mass.

Application January 3, 1950, Serial No. 136,511

1 Claim. (Cl. 346—101)

This invention relates to facsimile recorders, and particularly to a recorder which utilizes recording material of the electrolytic type.

In the art of transmitting intelligence in the form of facsimile records, many types of receiving apparatus have been suggested; these, if handled and taken care of with particular attention of their operational peculiarities, are fairly satisfactory, but they are not very well suited for essentially automatic service under the severe conditions of everyday use by more or less unskilled persons.

It is one of the main objects of the present invention to provide a facsimile recorder of the electrolytic type which will retain its usefulness under adverse operating conditions, can be serviced and operated by comparatively unskilled persons, is very simple and rugged, can be disassembled and reassembled without, or with the simplest tools, and reconditioned by exchanging a few simple parts or subassemblies, and is sufficiently compact to permit installation in supporting structures which offer only very restricted space.

Other objects of the invention are to provide a recorder of the above indicated type which can be fastened to, or incorporated in the structure of vehicles offering very little space for that purpose, such as automobiles (for example, police cars or fire trucks), locomotives, and airplanes, and which recorder will operate in all positions such vehicles might assume, and which will withstand the unavoidable vibrations and shocks to which they may be subjected during such use; to provide a tape recorder which permits very easy exchange, removal, and severance of the recording strip, such as can be carried out by altogether unskilled operators; to provide a facsimile recorder which is adapted to furnish a duplicate record, one easily detachable, and one which may be preserved in a sealed container inaccessible to the operator; to provide a facsimile tape recorder which is sealed against dust, moisture, and similarly unfavorable extraneous matter, and which nevertheless is easily accessible for carrying out the necessary operations of exchanging recording material, inspecting parts which are subject to wear, and which permits quick separation of the mechanical or drive, and recording units of the apparatus; and which advances the art generally.

In a broad aspect the invention contemplates facsimile receiving apparatus comprising a housing divided into a recorder compartment, a drive compartment and a transmission compartment. Within the recorder compartment is arranged recording means including a storing roll and a recording drum. A delivery roll is mounted outside the recorder compartment substantially parallel to the recording drum. Driving means are provided which extend from the motor means housed in the drive compartment, the drum and the delivery roll respectively into the transmission compartment. In another aspect a cover is provided over the recorder means which cover is fastened to the housing by hinge means so that a slot is formed between the cover and the recorder compartment adapted to pass a record strip or tape from the drum to the delivery roll and cooperating holding roll means.

In still another aspect a duplicate record compartment is provided for one of two superimposed webs from a duplicate recording strip which is inscribed by the recording means. A takeup roll is arranged in the duplicate record compartment with its axis parallel to the axis of delivery roll so that one of the inscribed webs is wound thereupon by means of a drive extending from the transmission compartment. The inscribed web may be fed over an apron projecting substantially horizontally outward from the record compartment at the outside thereof from the slot in communication with the inside of the compartment. In a preferred embodiment the duplicate record compartment is tiltable around its hinged connection to expose the takeup roll and is provided with locking means for normally securing the compartment to the apron to prevent unauthorized access thereto.

In a further aspect the transmission compartment incorporates a removable transmission unit which is secured thereto by attaching means preferably engageable elements associated with the compartment and the removable transmission respectively to locate the same. A further feature of the drive includes a slip clutch interposed in the driving means from the drum to the transmission compartment which may optionally be located within the drum or as an element of the reduction gear train in the transmission compartment. Means operable from a remote source are provided to inhibit or prevent rotation of the drum at predetermined times without stopping the motor means. Such means preferably comprise a solenoid arranged in the motor compartment and having a plunger for engaging the hub or other portion of the rotatable drum so that it is always restrained at the same relative position.

These and other objects, aspects and features will be apparent from the following description of several illustrative specific embodiments of the invention referring to drawings in which Fig. 1 is a plan view of one embodiment of facsimile record apparatus according to the invention;

Fig. 4 is a section on line 4—4 of Fig. 3;

Fig. 5 is a partial section on line 5—5 of Fig. 1;

Fig. 6 is a longitudinal section through the paper roll carrier;

Fig. 7 is a longitudinal section through the recorder drum;

Fig. 8 is a fragmentary section of the cover showing the recorder bar suspension;

Fig. 9 is an isometric view of the recorder bar;

Fig. 10 is a front elevation view of a modified embodiment of the invention with the walls of the transmission compartment partially broken away;

Fig. 15 is a fragmentary portion of one end of the recorder roll showing a locking recess.

Figure 1:
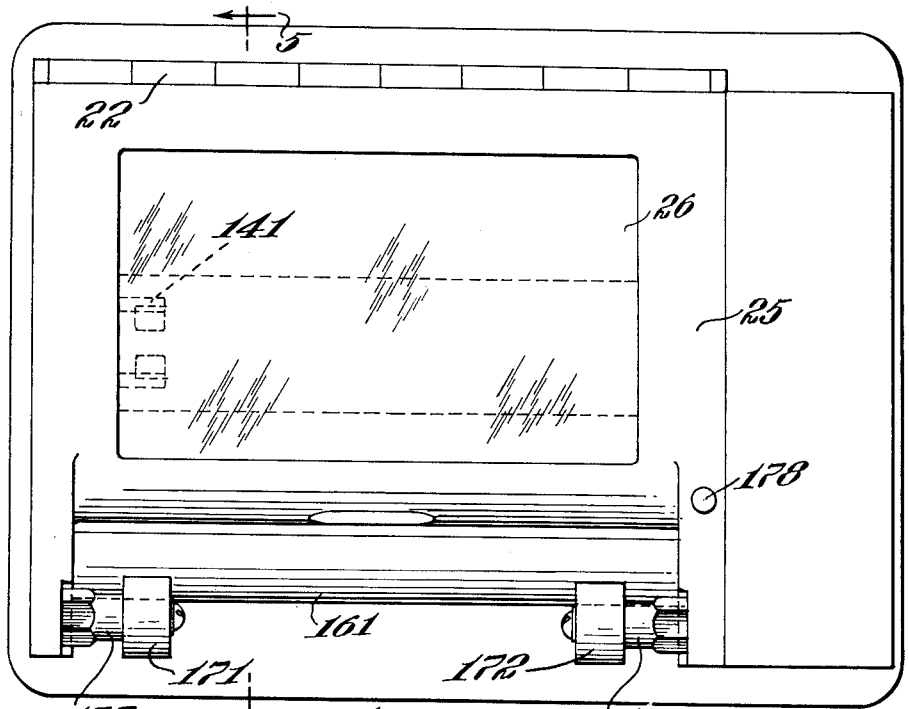
Figure 2:
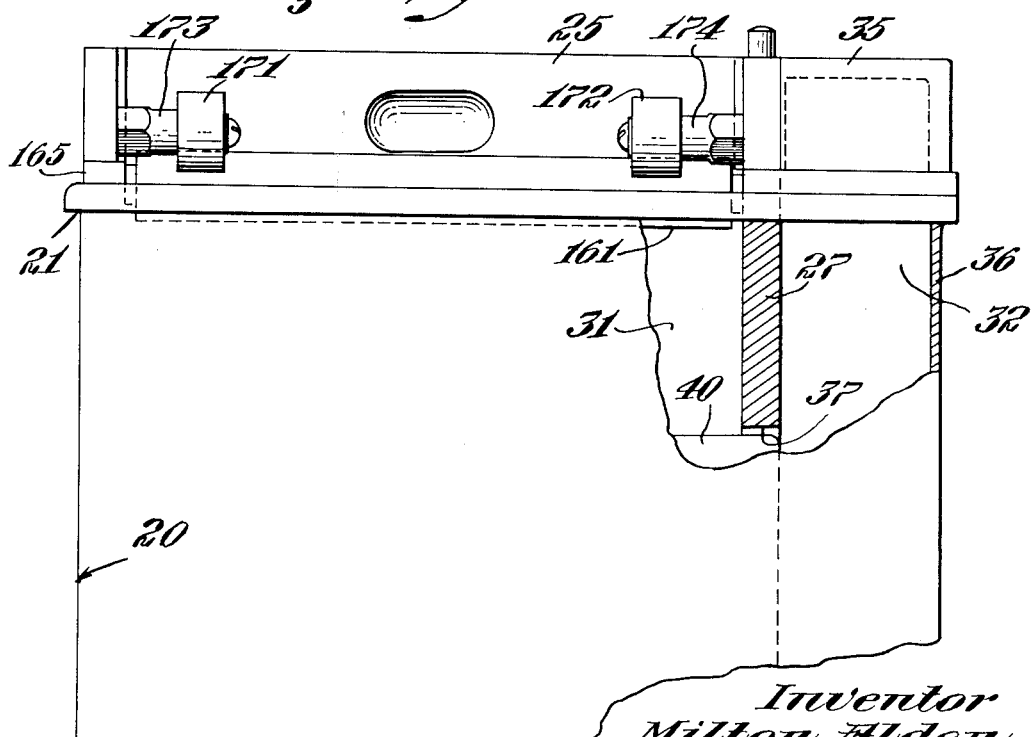
Fig. 2 is the front elevation in partial section of the apparatus shown in Fig. 1.
Figure 3:
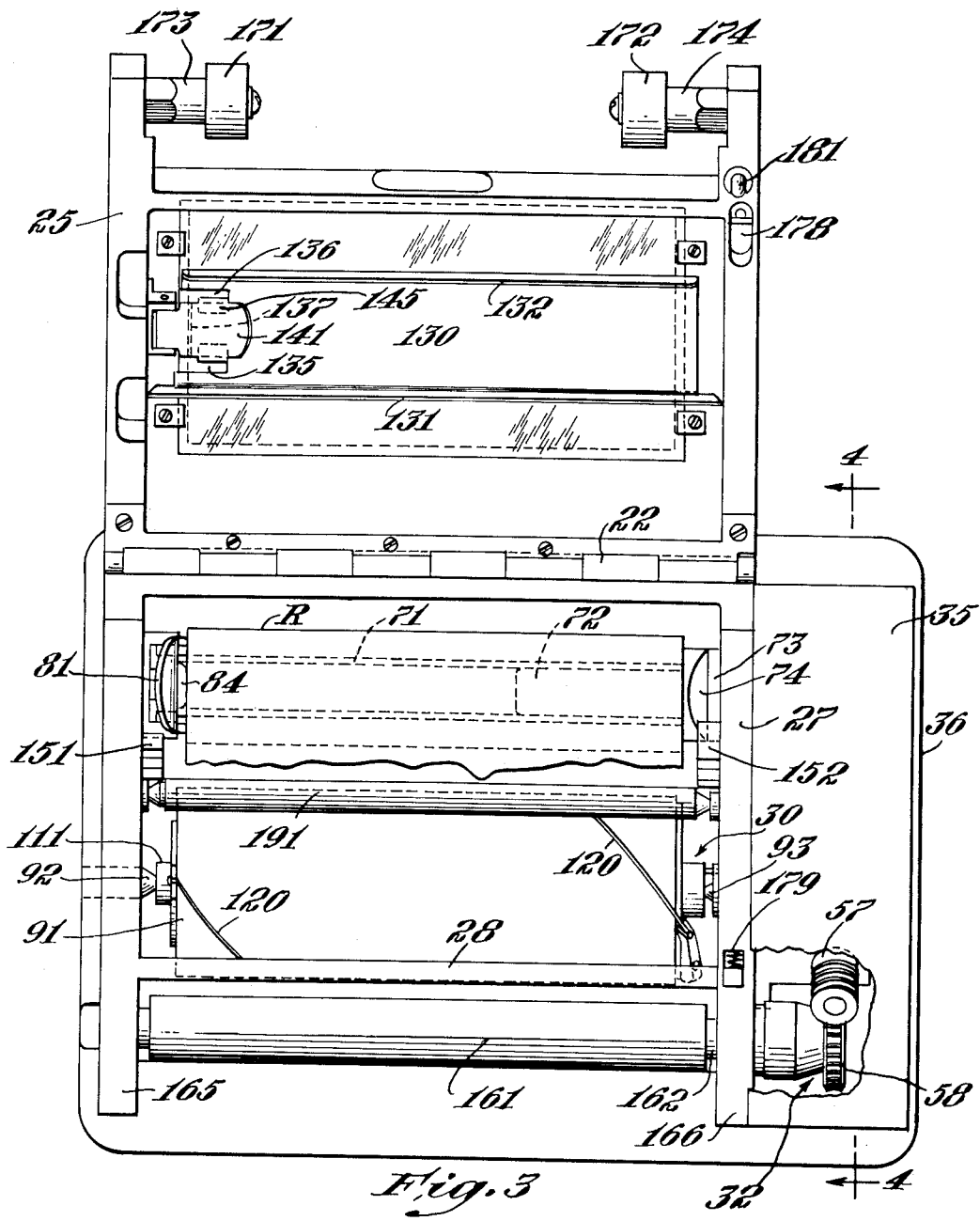
Fig. 3 is a plan view similar to Fig. 1 with the cover lifted to show the recording compartment.

Referring to Fig. 2, the first embodiment of the invention which is illustrated comprises a rigid housing 20 which may be either cast or welded construction and having flanges 21 for attaching it to the structure (not shown) to which it is incorporated, for example the dashboard of an automobile. The housing 20 has means such as hinge portions 22 (Fig. 1) engaging corresponding hinge means of the cover or lid 25. A glass plate 26 is set into an aperture in the cover to permit visual inspection of the mechanism within the device without lifting the cover. As indicated in Figs. 3 and 5, the housing 20 has separating walls 27 and 28 which divide it into a recorder compartment 30, a drive compartment 31, and a transmission compartment 32. The transmission compartment 32 is fully enclosed by means of a cover 35 (Fig. 2) and a cover plate 36. An opening 37 (Fig. 4) is formed in the partition 27 and across this opening there is screwed a bracket or strip 39 to which a drive motor 40 is bolted. The motor has a shaft 41 which carries at its outer end a gear element, for example a worm 42.

In the transmission compartment 32 is mounted a gear train 50 having a shaft 51 carrying a worm gear or wheel 52 engaging the above mentioned worm 42 fastened to motor shaft 41. The shaft 51 also carries both a bevel gear 54 engaging a similar gear 55 for driving the recording drum 91 and a worm 57 engaging the worm wheel 58 secured to a shaft 162 of a driver roll 161 to be described hereinbelow. The transmission assembly 50 is supported upon suitable bearings 59 mounted on a base plate 60 which is bolted or otherwise fastened to the wall 27.

As shown in Fig. 6, the recorder compartment 30 contains a tubular paper roll bobbin or core 71 held in position by means of a stud shaft 72 which is attached to an ejector assembly consisting of a base plate 73 screwed to the outer housing wall, and a chamfered ejector stop 74 which is hinged as at 75 to the base 73 and which is by a spring 76 urged to tilt the stud 72 outwardly from the recorder compartment. On the other side, the core 71 is normally engaged by a latch device which consists of a handle 81 hinged at 82 to the housing wall and urged inwardly by spring 83 which tends to keep a boss 84 in engagement with tube 71. It will be evident that withdrawal of boss 84 from tube 71 by swinging handle 81 outwardly will release the tube 71 with its paper roll which thereupon swings outwardly from the recorder compartment, so far as the chamfered portion of stop element 74 permits, that is until the faces of elements 73 and 74 engage under the force of spring 76.

The recorder compartment 30 further contains the recorder drum 91 (Figs. 3 and 7). This drum rotates on two point pivots 92 and 93. Pivot 93 is centered on a pin shaft 95 fixed to the gear 55 which meshes with the above mentioned bevel gear wheel 54 of the tranmission assembly 50. For a purpose which will appear hereafter, recess 99 of the base plate of pivot 93 engages a pin 96 of one half of a conical slip or friction clutch 101 which has a bushing 102 that is suitably recessed to engage the point of pivot 93. A clutch spring 103 urges coupling half 101 towards a corresponding coupling half 105 which is secured to the body of the drum 91 proper.

On the opposite side of the drum 91, a conically recessed shaft 111 is shaped to engage pivot 92 and held in the end of the drum 91 by means of a disk 112 and a spring 115 which urges the stud recess against the pivot point 92. It will now be evident that the recorder drum 91 can be removed from its pivot bearings by pressing it towards pivot 92 whereupon the bushing 102 is disengaged from its pivot 93 and can be swung outwardly, pin 95 slipping easily from the open recess 99 of the base plate of pivot point 93.

The recorder drum 91 carries a helix wire 120 (Fig. 3), suitably attached to the drum. The drum itself is made of insulating material as indicated in Fig. 7, whereas the helix wire 120 is of conducting material, and is electrically connected to the receiving circuit of the recorder, for example by means of a brush in contact with end plate 113; the construction of the helix wire and its connection to the circuit not being part of the present invention are therefore not described in detail.

As is shown in Figs. 5 and 9 the recorder bar 130 is of generally channel or U-shaped configuration, having a flange-like pivot edge 131 and recording edge 132 joined by a web. The pivot edge flange 131 extends somewhat beyond the ends of the web which is provided at one end with a pair of spaced open-end slots 135 and 136, between which is a holding tongue 137. A clip 141 (Fig. 8) is loosely held to the cover 25 by means of a screw 142 which engages a slot 144 (see also Fig. 5) therein. A body 143 hinged to the clip 141, has two bar-receiving grooves formed by the bent over edges 145 so that they fit snugly to the above-mentioned holding tongue 137 of the recorder bar 130. From the above it will be evident that the recorder bar 130 is firmly affixed to the clip portion 143 which, however, is so attached to the cover 25 that the bar is somewhat loose when the cover is opened and also freely floats upon the recorder drum 91 in the manner now to be described.

Two opposed inside walls of the recorder compartment 30 each carry a respective registering bracket, designated 151 and 152 (Fig. 3) which brackets are provided with angular recesses or slots 155 so located that they accurately support and space the bar 130 with the cover 25 closed, when the pivoting edge 131 is arranged with its ends in these angular slots, the apices thereof being arranged to define the correct position of the recording edge 132 upon the recorder drum 91.

There is also mounted between the opposed walls of the recorder compartment 30 a guide roll 191 (Fig. 3) located between the recorder drum 91 and tube 71 as is shown in Fig. 5. The cover 25 has an intermediate partition 25' which meets the top edge of the compartment 30 thereby completing the closing of the recorder compartment. The lower edge of the partition 25' forms a slot 200 of sufficient width to accommodate the recording strip or tape R so that it may pass therethrough. Outside the intermediate partition 25', is supported the drive roll 161 on the shaft 162 which is journaled between forwardly projecting wall portions 165, 166 (Fig. 3) of the main housing 20 so that it extends into the transmission compartment 32 through the wall portion 166 where it carries the above mentioned worm wheel 58, engaging worm 57 of the transmission assembly 50.

In front of the partition 25' the cover 25 carries two idler rolls 171, 172 on stud shafts 173 and 174 which are suitably fastened to the cover. Rolls 171 and 172 are preferably made of rubber and contact, or nearly contact drive roll 161, when cover 25 is closed and form together with the drive roll 161 a means for drawing the tape R from the recorder compartment 30.

Suitable means for securing cover 25 to housing 20, are provided, such as indicated in Fig. 4, where 178 is a push button for releasing a spring pressed catch 179 (Fig. 3) set in a recess found in the top of the wall 27. An ejector pin 181 backed by a spring 182 (Fig. 4) is received into the cover 25 and tends somewhat to lift the cover from the housing, facilitating opening of the cover when the catch 178 is released and also to cushion the contact between cover and housing when the former is closed.

A facsimile recorder of the above described type operates as follows: With the cover 25 in open position, a roll of recording paper R (Figs. 5 and 6), carried by core 71, is inserted upon stud 72 which, when empty, is extended from the recorder compartment 30 by the spring 76. The roll is then swung inwardly where the boss 84 automatically engages the free end of tube 71, thus completely attaching the recording roll to the housing. The end of the paper roll is then threaded below the guide roll 191 (Fig. 5) passed over the record drum 91 and pulled over the drive roll 161 so that its end portion extends beyond the housing flange 21. The cover 25 is thereupon closed, which automatically brings the edge 131 of the bar 130 into contact with the paper which is forced against a point of the recording drum helix 120. Closing of the lid also brings rolls 171, 172 into contact with the paper, securing the latter between these two rolls and the drive roll 161. The driving motor is then brought into synchronism with the transmitting apparatus (not shown) and a signal potential applied between the recorder helix 120 and the recording edge 131 of bar 130 causing the recording paper R to be impressed with visible indicia in the well known manner.

As the recording paper R advances from drive roll 161 and hold-down rolls 171 and 172 through the slot 200 (Fig. 5) between housing wall 28 and the partition 25', any portion thereof can be easily detached by tearing it against outer edge of the cover 25. When the paper is exhausted, the cover 25 is lifted after being released by the button 178, and handle 81 (Fig. 6) is slightly pressed towards the housing wall so that the empty tube 71 can be easily detached and a new paper roll inserted, whereupon that roll is returned to the recording compartment where it is automatically engaged by the boss 84 as above described.

In Fig. 10 there is shown a modified form of the invention which is particularly suitable for making duplicate records. In this embodiment of the invention, the housing 20 (Fig. 11) has a laterally extending peripheral flange 21 by means of which it may be supported and there is hinged to it at 22 a cover 25. The housing 20 is divided by means of walls 27 (Fig. 11) and 28 (Fig. 10) into a recorder compartment 30, a driving compartment 31, and a transmission compartment 32 as in the first embodiment. A duplicate record compartment is provided for by a substantially rectangular walled receptacle 202 (Fig. 12) hinged at 204 to the forward wall of the housing 20. Extending laterally from the forward wall in a substantially horizontal direction, is an apron 206 which overlies the top of the duplicate record compartment and forms a cover therefor. A conventional lock 208 is provided for locking the duplicate record compartment to the underside of the apron 206 to prevent unauthorized access thereto.

Figure 11:
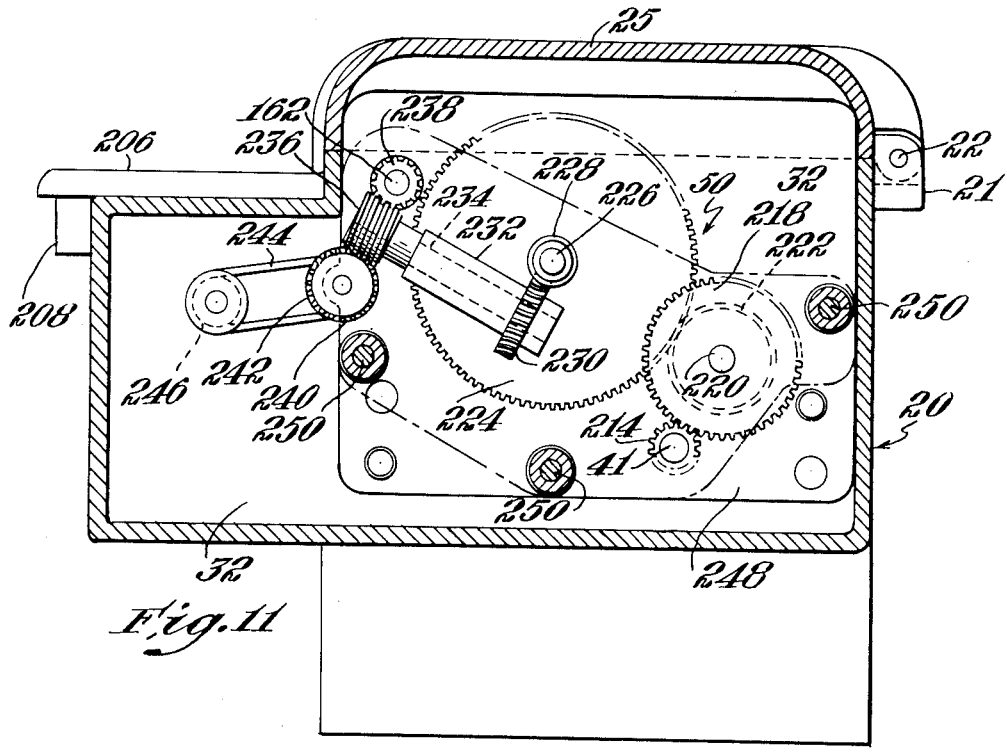
Fig. 11 is a section on line 11—11 of Fig. 10.
Figure 14:
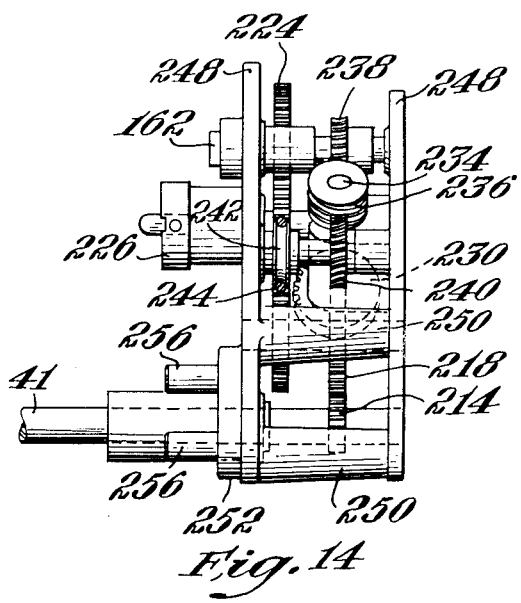
Fig. 14 is a side view of the transmission unit shown in Fig. 13.

The recorder compartment 30 contains the supply roll R, the record drum 91 and the recording bar 130. The duplicate record compartment 202 contains a take-up roll 210. The rolls R and 210 together with the take-off or drive roll 161 and the drum 91 are driven by means of a motor 40 mounted within the driving compartment 31. As illustrated in Fig. 10, the motor 40 extends downwardly from the wall 28 being secured by studs 212 to drive through a coupling 43 a shaft 41 which extends laterally from the end thereof through the wall 27 into the transmission compartment 32 to support a gear 214. Referring to Figs. 10, 11 and 14 shown enclosed in the transmission compartment 32 is a gear reduction unit including a gear 218 fixed to a shaft 220 upon which there is also mounted a gear 222. The gear 218 meshes with the gear 214; the gear 222 meshing with a gear 224 fixed to a shaft 226 upon which the recording drum 91 is mounted. Also fixed on the shaft 226 is a worm 228 which meshes with a worm gear 230 which is fixed to a shaft 234 journaled in a sleeve 232. The shaft 234 has a worm gear 236 upon its opposite end which meshes both with a worm wheel 238 fixed to the shaft 162 of the take-off roll 161 and a second worm wheel 240. The worm wheel 240 is arranged to drive a pulley 242 on the same shaft therewith and the pulley is connected by means of a belt 244 to a pulley 246 mounted on the shaft which carries the take-up roll 210.

Figure 13:
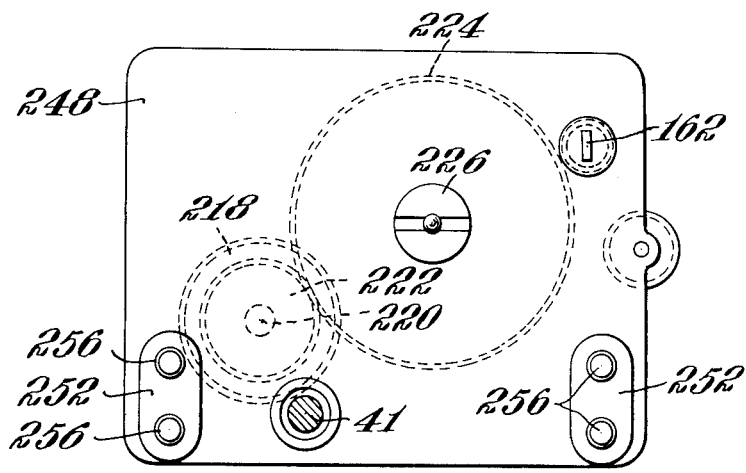
Fig. 13 is a front view of the transmission unit removed from the housing.

The shafts carrying the aforesaid gearing are journaled in bearings in a pair of parallel spaced plates 248 (Fig. 14). The plates 248 are held in spaced relation by integrally formed transversely extending brace members 250. The transmission unit is thus formed being removably mounted on the wall 27 by means of a pair of spaced bosses 252 (Fig. 13) having locating pins 256 by means of which the gear unit may conveniently be located and supported while screws 254 are being threaded through apertures in these bosses and into the wall 27. It will be noted to permit ready removal of the transmission gear unit, the shaft 226 projecting from the recorder compartment 30, and the shaft 162 projecting from the drive compartment 31 into the transmission compartment 32 are each provided with a tongue and groove connection so that they can be engaged and disengaged solely by axial movement of the gear unit. The shaft 41 breaks at the coupling 43.

In this modified form of the apparatus as in the previously described apparatus it is often desirable to synchronize, that is, bring the rotation of the recorder drum into the proper relationship with the transmitting drum at the originating station and hence there is shown herein specific means for accomplishing this by stopping the recorder drum at a predetermined position so that it will always start at the same point. To accomplish this a solenoid 258 (Fig. 12) is placed in the driving compartment 31 and is bolted to a pair of depending studs 260 formed on the lower side of the wall 28. The solenoid plunger 262 is arranged to engage a recess 264 (Fig. 15) formed in a laterally extending hub 266 formed on the recorder drum 91. With this arrangement when the proper impulse signals are received from the originating station the solenoid 258 is actuated to retract the plunger 262 and thereby allow the drum 91 to rotate. As heretofore described the drum 91 is driven through a friction clutch similar to that shown in Fig. 7 consisting of the members 101 and 105 hence during such time as the plunger 262 occupies the recess 264 the clutch will slip and allow the motor 40 to continue to drive the gearing without danger thereto.

Figure 12:
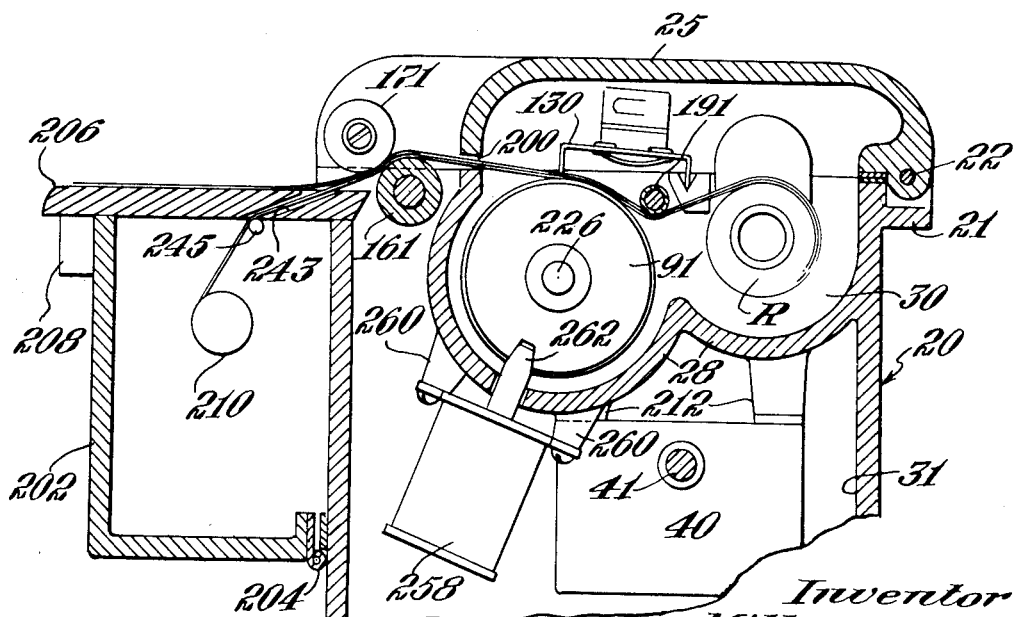
Fig. 12 is a section on line 12—12 of Fig. 10.

As shown in Fig. 12, the storing or supply roll of paper R has wound thereon a duplex recording strip comprising top and bottom webs which are led from it beneath the guide roll 191 over the recorder drum 91. The signal potential applied between the drum helix and the recorder bar 130 causes simultaneous electrolytic action in both webs thereby resulting in two visible records. The webs are then led through the slot 200 and between the delivery rolls 161 and 171. As this duplicate strip is delivered from beneath the rolls 161 and 171, the top web is received upon the apron 206 while the bottom web is directed through a slot 243 and over a guide bar 245 onto the take-up roll 210. By employing this duplicate record and securing the bottom web of it in the locked compartment 202 a complete intact record of what has been transmitted to the receiver is kept so that, for example, the recipient of the transmitted message cannot deny that certain material was received.

It should be understood that the present disclosure is for the purpose of illustration only and that this invention includes all modifications and equivalents which fall within the scope of the appended claim.

I claim:

Apparatus for recording on a web comprising a housing having a plurality of walls forming a recorder compartment, means outside said compartment for drawing said web through said compartment, a movable cover for said compartment pivoted thereto, a recording electrode carried by said cover and movable therewith into contact with one side of said web, a recorder drum in said compartment, a second cooperating electrode carried by said drum, mounting members supported in said compartment for rotatably supporting said drum with said second electrode in contact with the other side of said web, one of said members comprising a bearing and the other a drive transmission for said drum, said cover and first said electrode being adapted to swing away from said compartment to expose said drum, and means permanently secured to one of said drums and mounting members releasably securing the drum to said members, whereby when the cover and first said electrodes are swung away from said compartment to expose said drum, the drum may be removed without other disassembling of the apparatus, said means including a spring pressed disk located within the drum and having a stub shaft connected thereto and projecting through one end of the drum and engaging the adjacent mounting member.

References Cited in the file of this patent

UNITED STATES PATENTS

| Number | Name | Date |
|---|---|---|
| 1,848,862 | Young | Mar. 8, 1932 |
| 2,202,547 | Bushnell | May 28, 1940 |
| 2,354,836 | Rusch | Aug. 1, 1944 |
| 2,380,467 | Ressler | July 31, 1945 |
| 2,391,765 | Artzt | Dec. 25, 1945 |
| 2,412,310 | Young | Dec. 10, 1946 |
| 2,413,962 | Finch | Jan. 7, 1947 |
| 2,421,673 | Young | June 3, 1947 |
| 2,495,652 | Coburn | Jan. 24, 1950 |
| 2,540,081 | Alden | Feb. 6, 1951 |